F. PAMPE.
DISTILLATION PROCESS.
APPLICATION FILED APR. 18, 1905.
1,007,967.
Patented Nov. 7, 1911.
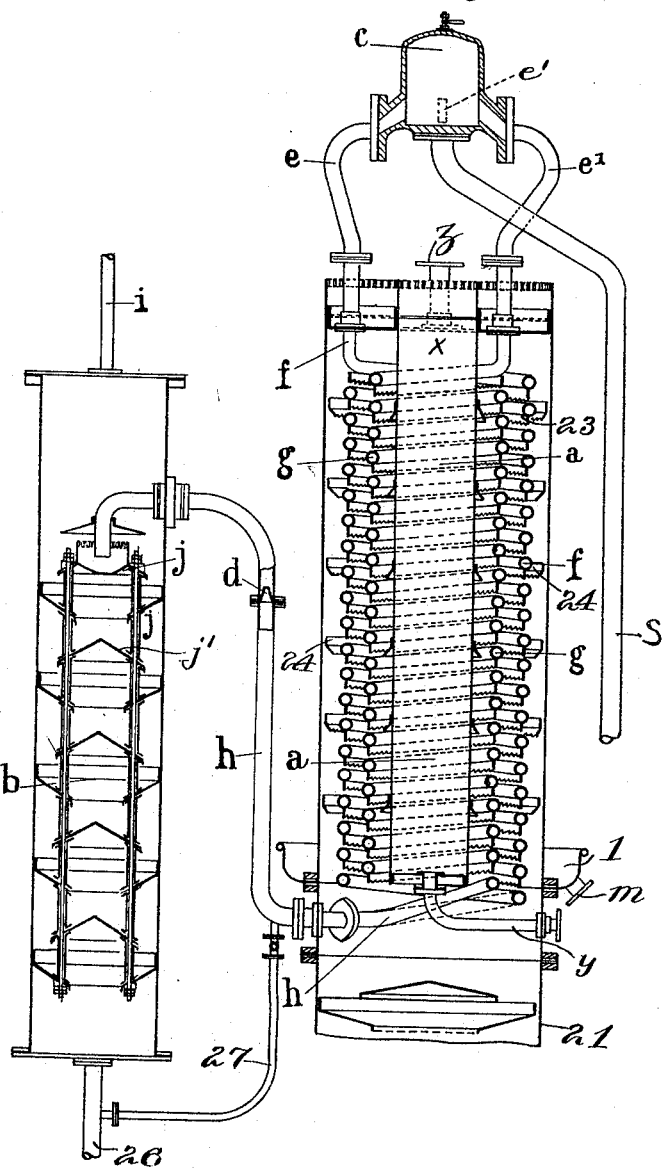
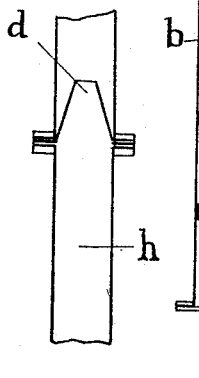
Witnesses
Inventor
Franz Pampe

UNITED STATES PATENT OFFICE.

FRANZ PAMPE, OF HALLE-ON-THE-SAALE, GERMANY.

DISTILLATION PROCESS.

1,007,967.    Specification of Letters Patent.    Patented Nov. 7, 1911.

Application filed April 18, 1905. Serial No. 256,276.

*To all whom it may concern:*

Be it known that I, FRANZ PAMPE, a subject of the King of Prussia, German Emperor, residing at the city of Halle-on-the-Saale, in the Kingdom of Prussia, German Empire, have invented certain new and useful Improvements in Distillation Processes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to distillation processes; and comprises certain improvements in methods of recovering pure high-grade alcohol from fermented liquids, said improvements comprising passing raw fermented liquids under some pressure through a heat-interchanger or dephlegmator connected with the head of a column still or similar fractionating device and releasing the pressure on such liquid under circumstances permitting the evolution of gases and vapors from the heated liquid, preliminary to the distillation of such liquid; all as more fully hereinafter set forth and as claimed.

In the ordinary distillation of fermented liquids in column stills and similar devices, the concentrated alcoholic vapors from the head of the still prior to passing to a condenser are sent through a heat-interchanger or dephlegmator, where they are somewhat cooled and thereby rendered stronger, the condensate (which is returned to the still) containing more water and less alcohol than is the case with the vapors.

The raw fermented liquid which is to be subsequently distilled is frequently used as the cooling liquid in the dephlegmator being thereby somewhat heated and since for efficient transfer of heat it is in practice necessary to use comparatively small tubing or conduits in this dephlegmator or preheater to secure a comparatively long path for the liquid or vapors which are to exchange heat, it frequently happens that such dephlegmators become "air-bound" from the evolution of gases therein, with resulting irregularities in the passage of liquid therethrough, the gases tending to accumulate in bends and angles and causing the liquid to pass in spurts. The raw fermented liquid is usually comparatively cold and is saturated with carbon dioxid from the fermentation so that upon heating or warming, gas separates. With this gas separates more or less aldehyde and other low-boiling bodies, and if gas and liquid be led together into the base of the still, the aldehyde, etc., passes upward with and ultimately contaminates the alcohol produced. Separation of gases and vapors in the dephlegmator and consequent irregular passage of cooling liquid therethrough is very disadvantageous since it interferes with the regularity of the cooling in such dephlegmator and, consequently, with the exactitude of the working of the still.

In the present invention, the stated disadvantages of the ordinary practice are overcome and certain new advantages secured.

The dephlegmator is, preferably, so constructed as to present a long, circuitous pathway for the raw fermented liquid so as to obtain a good transfer of heat. It is also so constructed that during the passage of such liquid through such pathway, the liquid may be maintained under a sufficient degree of pressure to prevent any substantial evolution of gases or vapors while becoming heated. The cool, raw fermented liquid passing through the dephlegmator under pressure becomes heated but its gases and vapors remain in solution, and this fact, together with the fact that its feed is under pressure, causes its flow to be even and regular, thereby conducing materially to evenness in operation of the dephlegmator. After passing the dephlegmator, the pressure on the liquid in the present invention is released whereupon the dissolved gases and aldehyde are evolved. To facilitate this evolution, the liquid after the release of pressure is filmed out upon suitable surfaces.

Preferably the length of pathway for the liquid in dephlegmator and the speed of passage are so regulated that the liquid emerges at a temperature of 75° to 76° C., or so that there is a temperature differential of only three or four degrees between the liquid and the vapors it is cooling. Pure alcohol boils at about 78° but the temperature of the alcoholic vapors in the head of a column still is somewhat higher. Under the pressure in the dephlegmator coils in the present invention the carbon dioxid and aldehyde do not gasefy to any extent even at the stated temperature of 75–76°, but when the pressure is released the carbon dioxid at once gasefies while with it is evolved most of the aldehyde. Aldehyde has a boiling point of about 21° C. and being little miscible with water, it has a great tendency to go off with evolving gas, particularly from this warm liquid. And with it go other low-boiling bodies to which much of the odor of crude alcohol, such as the alcohol from beet-sugar mashes, is due. These other low-boiling odoriferous bodies are nearly all water-immiscible. On the other hand, in the described process but little alcohol is evolved since it tends to stay behind, being a water-miscible body. The boiling point of the fermented liquids treated is ordinarily not much, if at all, below 90° C. Such as does pass away with the aldehyde can be condensed with it. Not more than one per cent. or so ordinarily goes over. The condensate from the filmed hot fermented liquid is ordinarily quite strong smelling and it can be used with advantage for denaturing purposes.

In the accompanying drawings I have shown, rather diagrammatically, one type of the many kinds of apparatus adapted for use in the described process, only sufficient of the ordinary still to which it is attached being shown to make clear its connection therewith.

In this showing, Figure 1 is a vertical section of the apparatus; and Fig. 2 is a vertical section of a detail.

In Fig. 1, $a$ represents the dephlegmator as a whole. As shown it forms an upward continuation of a fragmentarily shown column still 21, containing the usual fractionating devices. The dephlegmator is provided with an external gutter, $l$, to collect any water which may run down the outer wall and which is provided with an outlet $m$ for draining the water therefrom. Within the dephlegmator are two helical pipes $f$ and $g$, the pipe turns being provided with a depending flange 23 having a serrated lower edge. Similar flanges 24 on the walls of the dephlegmator direct any condensed liquid back on the coils. Raw fermented liquor or mash is sent through pipe $s$ by means of a pump (not shown) to a distributer $c$. From this distributer the liquor flows down through pipes $e$ and $e'$ into the two coils within the dephlegmator. The coils are shown surrounding an imperforate casing $x$, supported at $y$ and $z$, which serves to take up the space in the center of the dephlegmator and cause the vapors to travel in contact with the coils, and the two coils being of tubing of equal diameter and the liquid under the pump pressure, it is equally divided between the two. Below the dephlegmator, the two coils reunite to supply pipe $h$. Within this pipe is a constriction $d$. In passing this constriction, the pressure on the liquid due to the pump feed, to friction in the narrow passageways through which it passes and to the heat, is relieved and the contained carbon dioxid begins to gasefy, carrying with it the aldehydes, foul-smelling impurities and some portion of the fusel oil. To assist and facilitate this evolution of gas and vapor, the heated liquid is next caused to spread out in relatively thin traveling films or layers. For this purpose, pipe $h$ communicates with the top of a purifier column $b$, provided at its top with outlet $i$ leading to a condenser (not shown) for aldehyde, etc., and at its base with outlet 26 for the purified fermented liquid leading either back to the same still or another alcohol still. A valved by-pass pipe 27 establishes communication between $h$ and 26, for use when it may be desired to shut the purifier out of circuit for cleansing, etc. Within the purifier, is a system of alternate concave and convex shelves, $j$ and $j'$. In flowing down these shelves the hot liquid quickly loses its gas, etc., emerging at the base of the purifier in a purified state. No heat is ordinarily necessary in this purifier, the heat of the liquid itself sufficing. As its temperature however is only about 75–76° C. on entry and is still further reduced by the evolution of gases and vapors while its boiling point is ordinarily not much, if at all, below 90° C. there is very little evolution of alcohol, the alcohol being held back by its affinity for water. Not more than one per cent. or so of alcohol goes over with the aldehyde, etc., and this can subsequently be regained if necessary.

The purified liquid coming from the base of the purifier, being substantially free of aldehyde and foul-smelling, low-boiling impurities, may be introduced into the column still 21, or other suitable still and will there give clean-smelling high-grade alcohol. In directly distilling raw fermented liquids, these low-boiling bodies, being more volatile than alcohol itself pass up the column with the alcohol and are condensed with it, rendering it impure. In the present method, these low-boiling bodies are removed prior to the distillation of the liquid to gain alcohol.

The plus-pressure under which the liquid is sent through the preheater coils in the dephlegmator materially assists in even flow therethrough while permitting the use of relatively narrow conduits. In the structure shown, the descending liquid and ascending alcoholic vapors pass in thermal relation as counter-currents. The serrated flanges and shelves in the dephlegmator assist in securing good contact of condensing liquid with the coils of the preheater.

In the action in the purifier, the carbon dioxid being evolved throughout the mass of the filmed liquid has substantially the same effect as the passage of gas through any heated liquid: i. e., it tends to carry away the low-boiling immiscible liquids in greater amount than miscible liquids.

What I claim is:

1. In the distillation of alcoholic liquids, the process which comprises passing a current of ascending alcoholic vapors in thermal relationship to a counter-current of alcoholic liquid containing gas and volatile impurities, said counter-current being maintained under sufficient pressure to retain said gas in solution, and releasing said pressure and permitting the evolution of said gas and impurities out of contact with said vapors.

2. In the fractionation of compound liquids, the process which comprises passing a current of vapors of a volatile component of said compound liquid in thermal relationship to a counter-current of said liquid, said counter-current being maintained under sufficient pressure to retain still more volatile components in solution, releasing the pressure on said liquid out of contact with said vapors and separately collecting the evolved still more volatile components and the liquid from which they have been evolved.

3. In the distillation of alcoholic liquids, the process which comprises heating a confined current of fermented liquid, maintained under pressure, by the heat of concentrated alcoholic vapors, releasing the pressure on said liquid out of contact with said vapors and permitting evolution of contained gas and low-boiling impurities.

4. In the distillation of alcoholic liquids, the process which comprises heating a confined current of fermented liquid, maintained under pressure, by the heat of concentrated alcoholic vapors, releasing the pressure on said liquid out of contact with said vapors and spreading the liquid out in thin layers to permit evolution of contained gas and low boiling impurities.

5. In the distillation of alcoholic liquids, the process which comprises passing fermented liquid through the dephlegmator of an alcohol still while under pressure, releasing the pressure on the heated liquid, permitting the evolution of contained gas and low-boiling impurities and collecting said impurities.

6. In the distillation of alcoholic liquids, the process which comprises passing fermented liquid under pressure through the dephlegmator of an alcohol still, releasing the pressure spreading the liquid out in thin layers and permitting the evolution of contained gas and low-boiling impurities and collecting said impurities.

7. In the distillation of alcoholic liquids, the process which comprises passing fermented liquid under pressure through the dephlegmator of an alcohol still, releasing the pressure and spreading the liquid out into thin layers to permit evolution of gas and low-boiling impurities, and separately collecting such low-boiling impurities and the liquid from which they are evolved.

8. In the distillation of alcoholic liquids, the process which comprises passing fermented liquid under pressure through the dephlegmator of an alcohol still, releasing the pressure on the liquid, passing the liquid over the shelves of a separate column to permit evolution of gas and low-boiling impurities, collecting the impurities evolved in such column and also collecting the purified liquid for use in such still.

In testimony that I claim the foregoing as my invention, I have signed my name in presence of two subscribing witnesses.

FRANZ PAMPE.

Witnesses:
RUDOLPH FRICKE,
S. P. WARNER.

Copies of this patent may be obtained for five cents each, by addressing the "Commissioner of Patents, Washington, D. C."